(12) United States Patent
Keum et al.

(10) Patent No.: US 11,431,043 B2
(45) Date of Patent: Aug. 30, 2022

(54) METHOD FOR MANUFACTURING LOWER HOUSING OF BATTERY PACK

(71) Applicant: SAMSUNG SDI CO., LTD., Yongin-si (KR)

(72) Inventors: Jae Young Keum, Yongin-si (KR); Wun Seok Jeong, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 539 days.

(21) Appl. No.: 16/491,003

(22) PCT Filed: Jan. 23, 2018

(86) PCT No.: PCT/KR2018/000985
§ 371 (c)(1),
(2) Date: Sep. 4, 2019

(87) PCT Pub. No.: WO2018/186570
PCT Pub. Date: Oct. 11, 2018

(65) Prior Publication Data
US 2020/0020997 A1 Jan. 16, 2020

(30) Foreign Application Priority Data
Apr. 7, 2017 (KR) .................. 10-2017-0045511

(51) Int. Cl.
*H01M 10/6556* (2014.01)
*H01M 10/613* (2014.01)
(Continued)

(52) U.S. Cl.
CPC ......... *H01M 10/6556* (2015.04); *B29C 35/16* (2013.01); *H01M 10/613* (2015.04);
(Continued)

(58) Field of Classification Search
None
See application file for complete search history.

(56) References Cited

U.S. PATENT DOCUMENTS 9,017,062 B2   4/2015  Navarra Pruna
9,059,542 B2   6/2015  Oh et al.
(Continued)

FOREIGN PATENT DOCUMENTS

CN   104266389 A   1/2015
CN   104348026 A   2/2015
(Continued)

OTHER PUBLICATIONS

International Search Report dated Jun. 26, 2018 for PCT/KR2018/000985 filed Jan. 23, 2018.
(Continued)

*Primary Examiner* — Eli S Mekhlin
(74) *Attorney, Agent, or Firm* — Lee IP Law, P.C.

(57) ABSTRACT

A method for manufacturing a lower housing of a battery pack having an embedded cooling pipe comprises the steps of: preparing a cooling pipe, which protrudes to the outside of the lower housing so as to be insert-connected to an external quick connector, includes a locking protrusion having a first outer diameter at a quick connector insertion part to be connected to the quick connector, and a second outer diameter for enabling the protrusion to be fixed to the quick connector in the inward direction in a first length at the end of the quick connector insertion part, and has a joint part which has a predetermined length and a third outer diameter corresponding to the second outer diameter in the inward direction in a second length longer than the first length at the end of the quick connector insertion part, and which is to be disposed over a cooling pipe inlet of the lower housing; preparing a slider including one or more pipe insertion parts having inner diameters corresponding to the third outer
(Continued)

diameter of the joint part; inserting the quick connector insertion parts of the cooling pipes into the pipe insertion parts of the slider; coupling a lower housing mold to the cooling pipe; forming the lower housing by using the lower housing mold; and removing the slider and the lower housing mold.

6 Claims, 5 Drawing Sheets

(51) Int. Cl.
    *H01M 10/6567*     (2014.01)
    *B29C 35/16*     (2006.01)
    *B29L 31/00*     (2006.01)
    *H01M 50/20*     (2021.01)

(52) U.S. Cl.
    CPC ....... *H01M 10/6567* (2015.04); *H01M 50/20* (2021.01); *B29C 2035/1616* (2013.01); *B29L 2031/7146* (2013.01); *H01M 2220/20* (2013.01)

(56) References Cited

U.S. PATENT DOCUMENTS

| | | | |
|---|---|---|---|
| 9,077,114 | B2 | 7/2015 | Oh et al. |
| 10,056,658 | B2 | 8/2018 | Park et al. |
| 2014/0106022 | A1 | 4/2014 | Navarra Pruna |
| 2015/0031225 | A1 | 1/2015 | Oh et al. |
| 2015/0031228 | A1 | 1/2015 | Oh et al. |
| 2015/0375427 | A1 | 12/2015 | Hoong |
| 2016/0049705 | A1* | 2/2016 | Mahe ........................ F28F 3/10 29/890.03 |
| 2016/0268657 | A1 | 9/2016 | Park et al. |

FOREIGN PATENT DOCUMENTS

| | | |
|---|---|---|
| CN | 205291477 U | 6/2016 |
| CN | 105977582 A | 9/2016 |
| CN | 106329030 A | 1/2017 |
| DE | 10 2014 217 931 A1 | 3/2016 |
| EP | 2716428 A1 | 4/2014 |
| JP | 2007-001062 A | 1/2007 |
| JP | 2007-292290 A | 11/2007 |
| JP | 2014-191916 A | 10/2014 |
| JP | 2016-031798 A | 3/2016 |
| KR | 10-1357472 B1 | 2/2014 |
| KR | 10-2014-0077272 A | 6/2014 |
| KR | 10-2014-0083339 A | 7/2014 |
| KR | 10-2015-0128360 A | 11/2015 |

OTHER PUBLICATIONS

Extended European Search Report dated Dec. 15, 2020 of the corresponding European Patent Application No. 18780295.4.

* cited by examiner

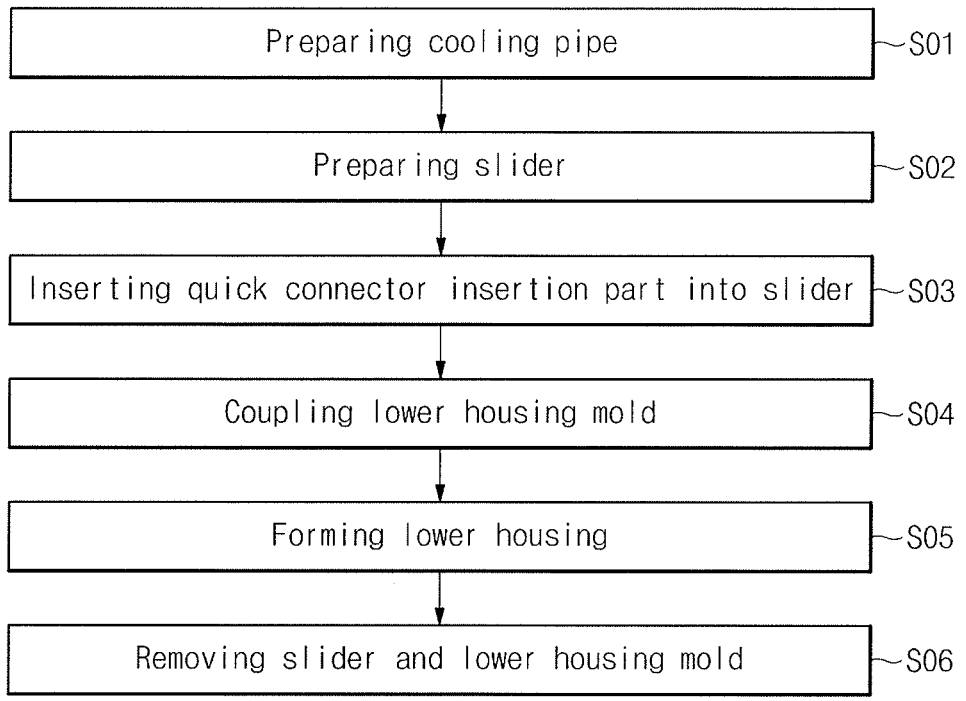
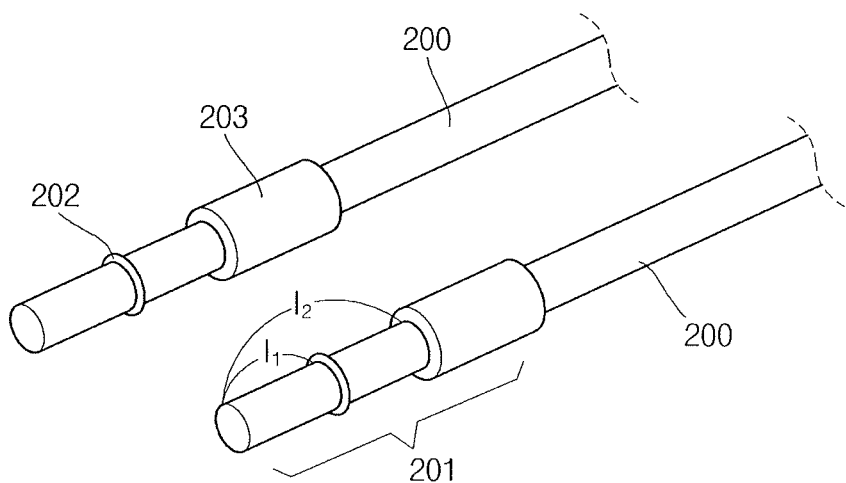

METHOD FOR MANUFACTURING LOWER HOUSING OF BATTERY PACK

CROSS-REFERENCE TO THE RELATED APPLICATION

This is the U.S. national phase application based on PCT Application No. PCT/KR2018/000985, filed Jan. 23, 2018, which is based on Korean Patent Application No. 10-2017-0045511, filed Apr. 7, 2017, the entire contents of all of which are hereby incorporated by reference.

TECHNICAL FIELD

The present invention relates to a battery pack. More particularly, the present invention relates to a method for manufacturing a lower housing of a battery pack.

BACKGROUND ART

In general, battery cells are used as the energy source for mobile devices, electric vehicles or hybrid vehicles and have a wide variety of configurations according to the kind of external device employing the battery cells.

Small-sized mobile devices, such as cellular phones, can be operated for a predetermined period of time using the output and capacity of a single battery. However, when a long-time operation or a high-power operation is required, like in an electric vehicle or a hybrid vehicle, a high-capacity battery module may be constructed to increase the output and capacity by electrically connecting multiple battery cells.

The output voltage or the output current of a battery module can be increased according to the number of battery cells incorporated in the battery module. A battery pack may be constructed by electrically connecting multiple battery modules.

Meanwhile, a locking protrusion for coupling a quick connector may exist in a quick connector insertion part of the battery pack. However, a slide may not be properly extracted due to locking protrusions, coupling a lower housing mold to the cooling pipe

Technical Problems to be Solved

The present invention provides a novel method for manufacturing a lower housing of a battery pack, which can solve a problem associated with slide extraction, which is caused due to an undercut shape of a lower housing mold.

Technical Solutions

In accordance with an aspect of the present invention, the above and other objects can be accomplished by providing a method for manufacturing a lower housing of a battery pack, the method comprising the steps of: preparing a cooling pipe, which protrudes to the outside of the lower housing so as to be insert-connected to an external quick connector, includes a locking protrusion having a first outer diameter at a quick connector insertion part to be connected to the quick connector, and a second outer diameter for enabling the protrusion to be fixed to the quick connector in the inward direction in a first length at the end of the quick connector insertion part, and has a joint part which has a predetermined length and a third outer diameter corresponding to the second outer diameter in the inward direction in a second length longer than the first length at the end of the quick connector insertion part, and which is to be disposed over a cooling pipe inlet of the lower housing; preparing a slider including one or more pipe insertion parts having inner diameters corresponding to the third outer diameter of the joint part; inserting the quick connector insertion parts of the cooling pipe into the pipe insertion parts of the slider; coupling a lower housing mold to the cooling pipe; forming the lower housing by using the lower housing mold; and removing the slider and the lower housing mold.

Meanwhile, the second outer diameter may be greater than the first outer diameter, and the third outer diameter may be greater than the second outer diameter. The second outer diameter may be greater than the first outer diameter, and the third outer diameter may be equal to the second outer diameter.

In addition, a length of the slider insertion part may correspond to a length of the cooling pipe protruding from the lower housing.

In an embodiment, a distance between one or more pipe insertion parts of the slide may correspond to a distance between quick connector insertion parts of the cooling pipe protruding to the outside of the lower housing.

In an embodiment, the step of forming the lower housing may be performed by using a molding process.

Advantageous Effects

As described above, in the method for manufacturing a lower housing of a battery pack according to an embodiment of the present invention, the quick connector insertion part of the cooling pipe includes a region having an outer diameter greater than that of the locking protrusion, and the quick connector insertion part is extracted through the slider to then fabricate the lower housing by molding, and the slider is then removed, thereby solving the problem associated with slide extraction due to an undercut shape of the locking protrusion.

BRIEF DESCRIPTION OF DRAWINGS

FIG. 2 is a flowchart illustrating a method for manufacturing a lower housing of a battery pack according to the present invention.

FIGS. 3A to 3G are views illustrating the method for manufacturing a lower housing of a battery pack according to the present invention.

BEST MODE FOR CARRYING OUT THE INVENTION

Figure 1A:
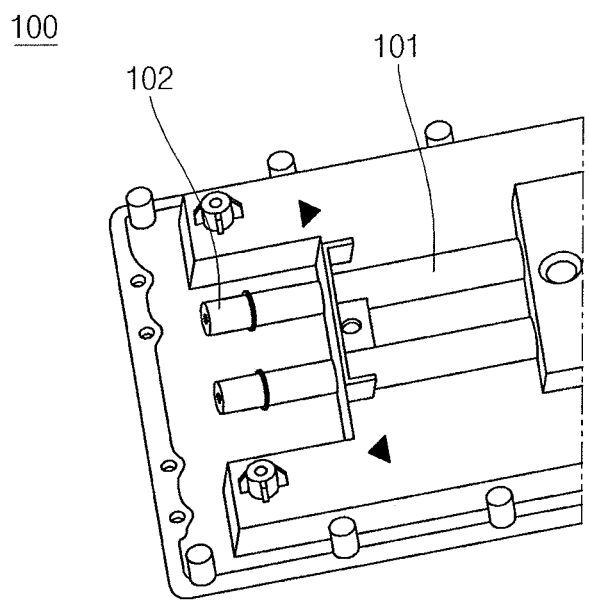
FIG. 1A is a perspective view of a lower housing of a battery pack and FIG. 1B is an enlarged view of a quick connector insertion part of a cooling pipe for the lower housing.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1B:
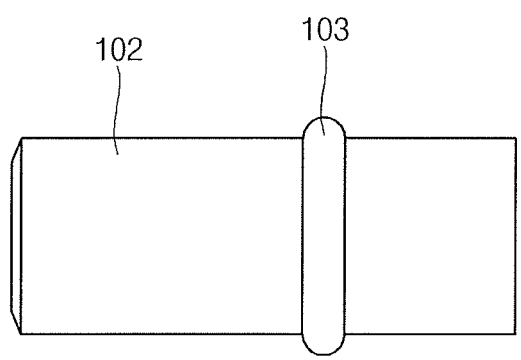

FIG. 1A is a perspective view of a lower housing of a battery pack and FIG. 1B is an enlarged view of a quick connector insertion part of a cooling pipe for the lower housing.

Referring to FIGS. 1A and 1B, the lower housing 100 of a battery pack includes multiple battery packs (not shown) coupled to its top portion to protect the battery packs from external factors. The lower housing 100 of a battery pack has an embedded cooling pipe 101 for cooling the battery pack. In addition, a quick connector insertion part 102 is exposed to the outside of the lower housing 100 so as to be connected to an external part of the cooling pipe. Meanwhile, the cooling pipe 101 of the lower housing 100 of the battery pack is necessarily manufactured to meet the global standard requirements. For example, if the cooling pipe 101 is manufactured to meet the global standard requirements of SAE J2044 quick connectors, the quick connector insertion part 102 of the cooling pipe 101 has a locking protrusion 103 to be locked on and fixed with a quick connector, as shown in FIG. 1B.

As such, if the locking protrusion 103 is located in the quick connector insertion part 102 of the cooling pipe 101 so as to have an outer diameter greater than that of the quick connector insertion part 102, the slide, which covers the quick connector insertion part 102 in fabricating the lower housing 100 in form of a mold (for example, in a die-casting process of lower housing), may be locked on the locking protrusion 103 so as not to be properly extracted and removed. In addition, if a pipe insertion part of the slide has a relatively large size, a melting material of the lower housing 100 may be injected into the slide insertion part.

FIG. 2 is a flowchart illustrating a method for manufacturing a lower housing of a battery pack according to the present invention. FIGS. 3A to 3G are views illustrating the method for manufacturing a lower housing of a battery pack according to the present invention.

Referring to FIG. 2, the method for manufacturing a lower housing of a battery pack according to the present invention includes the steps of preparing a cooling pipe (S01), preparing a slider (S02), inserting a quick connector insertion part into the slider (S03), coupling a lower housing mold (S04), forming the lower housing by using a lower housing mold (S05), and removing the slider and the lower housing mold (S06).

Referring to FIG. 3A, in the step of preparing a cooling pipe (S01), the cooling pipe 200 embedded in the lower housing 100 of the battery pack for cooling the battery pack is prepared. The cooling pipe 200 includes the quick connector insertion part 201, which protrudes to the outside of the lower housing 100 so as to be insert-connected to an external quick connector (not shown). Most regions of the quick connector insertion part 201 have a first outer diameter. The first outer diameter corresponds to an inner diameter of the quick connector insertion part 201. Meanwhile, the quick connector insertion part 201 includes a locking protrusion 202 having a second outer diameter for enabling the locking protrusion 202 to be fixed to the quick connector in the inward direction in a first length $l_1$ at its end, and a joint part 203 having a predetermined length and a third outer diameter corresponding to the second outer diameter in the inward direction in a second length $l_2$ at the end of the quick connector insertion part 201. The second length $l_2$ is greater than the first length $l_1$. The joint part 203 is a region cooling pipe 200 is installed to be embedded in the lower housing 100.

In the step of preparing a slider (S02), the slider 300 is prepared. The quick connector insertion part 201 of the cooling pipe 200 has a diameter corresponding to the third outer diameter of the joint part 203, and a length corresponding to a length of the cooling pipe 200 protruding from the lower housing 100. In addition, the slider 300 may include two or more pipe insertion parts 301 so as to correspond to the number of cooling pipes 200 protruding from the lower housing 100. That is to say, since two cooling pipes 200, consisting of a cooling water inlet pipe and a cooling water outlet pipe, are generally exposed from the lower housing 100 to be connected to the quick connector, two pipe insertion parts 301 are preferably installed in the slider 300, like the two cooling pipes 200. In addition, distances between each of the two or more pipe insertion parts 301 may correspond to distances between the quick connector insertion parts 201 of the cooling pipes 200, which are exposed from the lower housing 100 to then be spaced apart from each other.

Figure 3B:
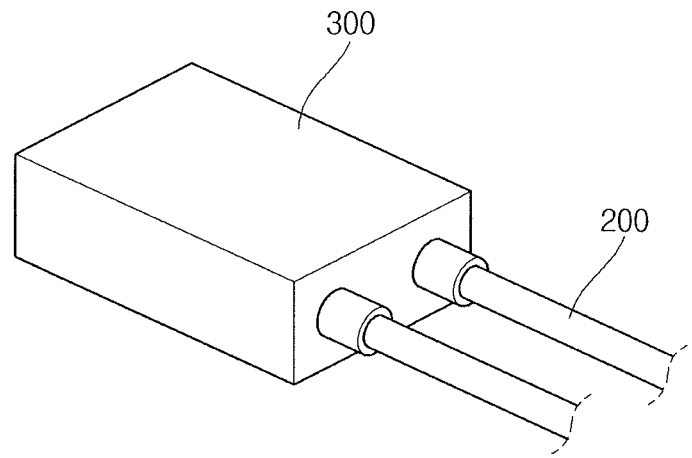
Figure 3C:
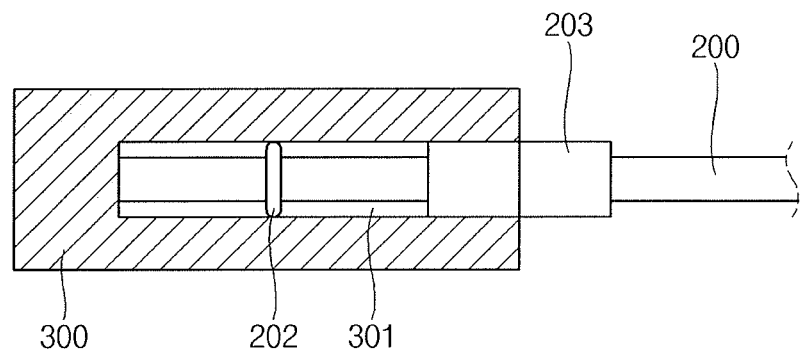

In the step of inserting the quick connector insertion part into the pipe insertion part of the slider (S03), as shown in FIGS. 3B and 3C, the quick connector insertion part 201 of the cooling pipe 200 is inserted into the pipe insertion part 301 of the slider 300. Here, as shown in FIG. 3C, since the quick connector insertion part 201 has an inner diameter large enough to accommodate the third outer diameter of the joint part 203 and the second outer diameter of the locking protrusion 202, the slider 300 is able to accommodate even a region of the joint part 203 without being locked on the locking protrusion 202. Here, the second outer diameter of the locking protrusion 202 is smaller than or equal to the third outer diameter of the joint part 203.

Figure 3D:
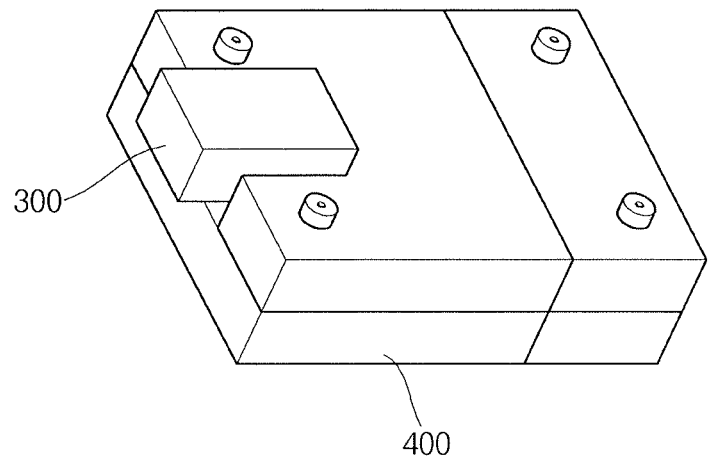

In the coupling of the lower housing mold (S04), as shown in FIG. 3D, the lower housing mold 400 is coupled to the cooling pipe 200. The lower housing mold 400 may also be coupled to the slider 300.

In the step of forming the lower housing (S05), a casting is poured to the lower housing mold to fabricate a mold of the lower housing 100. The lower housing 100 may be made from a metallic material, such as aluminum, or a plastic material.

Figure 3E:
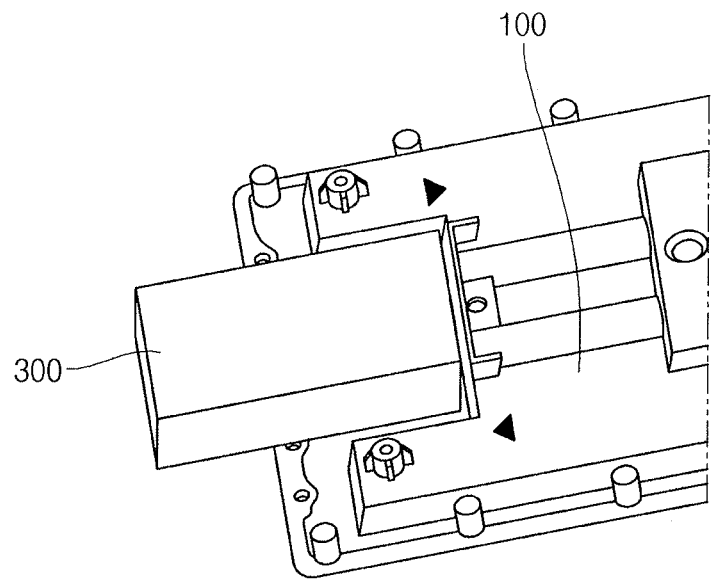

In the step of removing the slider and the lower housing mold (S06), as shown in FIG. 3E, the lower housing mold 400 is removed, leaving only the slider 300 coupled to the cooling pipe 200 in the formed lower housing 100. That is to say, the slider 300 may be extracted from the quick connector insertion part 201 of the cooling pipe 200 without being affected by the lower housing molding process.

Figure 3F:
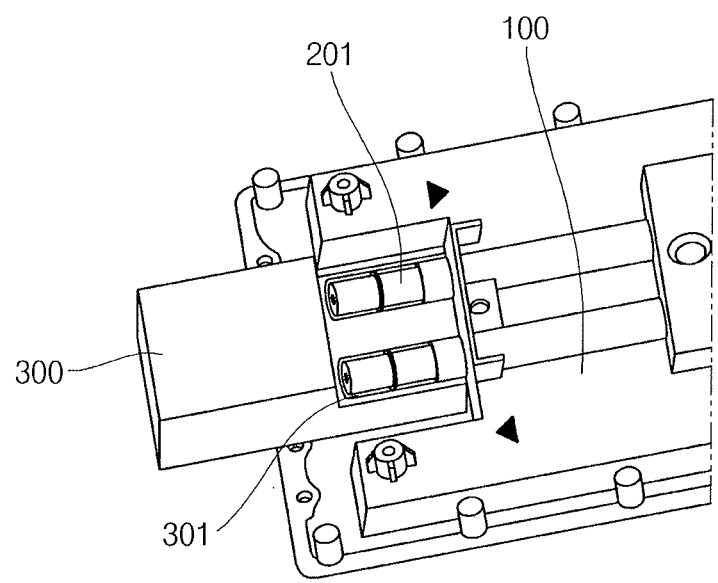
Figure 3G:
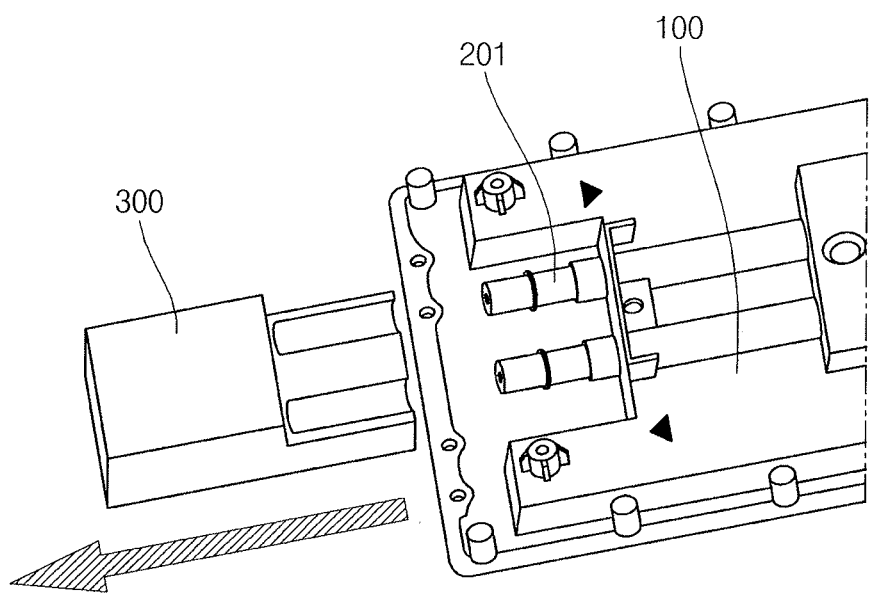

FIG. 3F shows a cutaway view illustrating an upper region of a section of the slide 300, into which the cooling pipe 200 is inserted. Referring to FIG. 3F, some regions of the locking protrusion 202 and the joint part 203 of the quick connector insertion part 201 are inserted into the pipe insertion part 301 of the slide 300, and it is confirmed that molding of the lower housing 100 is not affected by the quick connector insertion part 201. In addition, the outer diameter of the locking protrusion 202 of the quick connector insertion part 201 is smaller than the inner diameter of the pipe insertion part 301, the slider 300 may not be locked on the locking protrusion 202, thereby obviating a possible problem associated with slider extraction in the step of removing the slider 300. Accordingly, as shown in FIG. 3G, if the slider 300 is extracted and removed from the quick connector insertion part 201, the quick connector insertion part 201 of the cooling pipe 200, which protrudes to the outside of the lower housing 100, is finally disposed over a cooling pipe inlet of the lower housing 100. In addition, the locking protrusion 202 to be coupled to a quick connector (not shown) may exist in a mid portion of the quick connector insertion part 201.

As described above, in the method for manufacturing the lower housing of the battery pack according to an embodiment of the present invention, a region of the quick connector insertion part of the cooling pipe has an outer diameter larger than or equal to that of the locking protrusion (i.e., the joint part of the cooling pipe), and the quick connector insertion part is extracted through the slider to fabricate a mold of the lower housing, followed by removing the slider, thereby solving the problem associated with the slide extraction due to an undercut shape of the locking protrusion.

Although the foregoing embodiment has been described to practice the lower housing of a battery pack of the present invention, the embodiment is set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

| Explanation of reference numerals | |
| --- | --- |
| 100: Lower housing | 101, 200: Cooling pipe |
| 103, 202: Locking protrusion | 203: Joint part |
| 300: Slider | 301: Pipe insertion part |
| 400: Lower housing mold | |

The invention claimed is:

1. A method for manufacturing a lower housing of a battery pack, the method comprising:
preparing a cooling pipe, which protrudes to an outside of the lower housing so as to be insert-connected to an external quick connector, includes a locking protrusion having a first outer diameter at a quick connector insertion part to be connected to the external quick connector, and a second outer diameter for enabling the locking protrusion to be fixed to the external quick connector in an inward direction in a first length at an end of the quick connector insertion part, and has a joint part which has a predetermined length and a third outer diameter corresponding to the second outer diameter in the inward direction in a second length longer than the first length at the end of the quick connector insertion part, and which is to be disposed over a cooling pipe inlet of the lower housing;
preparing a slider including one or more pipe insertion parts having inner diameters corresponding to the third outer diameter of the joint part;
inserting the quick connector insertion parts of the cooling pipe into the pipe insertion parts of the slider;
coupling a lower housing mold to the cooling pipe;
forming the lower housing by using the lower housing mold; and
removing the slider and the lower housing mold.

2. The method as claimed in claim 1, wherein the second outer diameter is greater than the first outer diameter, and the third outer diameter is greater than the second outer diameter.

3. The method as claimed in claim 1, wherein the second outer diameter is greater than the first outer diameter, and the third outer diameter is equal to the second outer diameter.

4. The method as claimed in claim 1, wherein a length of the slider insertion part corresponds to a length of the cooling pipe protruding from the lower housing.

5. The method as claimed in claim 1, wherein a distance between one or more pipe insertion parts of the slider corresponds to a distance between quick connector insertion parts of the cooling pipe protruding to the outside of the lower housing.

6. The method as claimed in claim 1, wherein forming the lower housing is performed by using a molding process.

* * * * *